United States Patent
Hoolhorst

[11] Patent Number: 6,006,987
[45] Date of Patent: Dec. 28, 1999

[54] REMOVABLE CARD CARRIER ASSEMBLY

[75] Inventor: Albert Hoolhorst, Aardenburg, Netherlands

[73] Assignee: Siemens Aktiengesellschaft, Munich, Germany

[21] Appl. No.: 08/996,371

[22] Filed: Dec. 22, 1997

[30] Foreign Application Priority Data

Dec. 20, 1996 [DE] Germany .................. 196 53 597

[51] Int. Cl.$^6$ .................. G06K 5/00; G06K 17/00
[52] U.S. Cl. .................. 235/375; 235/441; 235/482; 235/495
[58] Field of Search .................. 235/375, 376, 235/441, 486, 492, 479, 482, 485, 495; 361/377

[56] References Cited

U.S. PATENT DOCUMENTS

| | | | |
|---|---|---|---|
| 3,706,874 | 12/1972 | Lockard | 235/473 |
| 4,004,136 | 1/1977 | Torok et al. | 235/449 |
| 4,822,988 | 4/1989 | Gloton | 235/492 |
| 4,904,853 | 2/1990 | Yokokawa | 235/492 |
| 4,994,659 | 2/1991 | Yabe et al. | 235/492 |
| 5,036,184 | 7/1991 | Sasaki | 235/479 |
| 5,146,069 | 9/1992 | Orimoto et al. | 235/475 |
| 5,192,859 | 3/1993 | Kojima et al. | 235/481 |
| 5,262,629 | 11/1993 | Hayashi et al. | 235/486 |
| 5,563,400 | 10/1996 | Le Roux | 235/486 |
| 5,594,233 | 1/1997 | Kenneth et al. | 235/492 |
| 5,648,651 | 7/1997 | Inoue | 235/475 |
| 5,733,147 | 3/1998 | Verstijnen | 235/441 |
| 5,790,659 | 8/1998 | Strand | 379/433 |
| 5,836,779 | 11/1998 | Vogler | 235/479 |

*Primary Examiner*—Thien M. Le
*Assistant Examiner*—Daniel St. Cyr
*Attorney, Agent, or Firm*—Herbert L. Lerner; Laurence A. Greenberg

[57] ABSTRACT

A card carrier part is inserted into a contact carrier part of a card reader together with a card to be read therein. The card carrier part is embodied such that it can be slipped onto an edge portion of the card, thereby clamping the edge in place. As a result, both the size of the card carrier part and the size of a card reader that uses such a card carrier part can be reduced to a minimum.

8 Claims, 4 Drawing Sheets

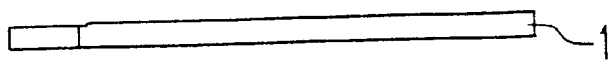
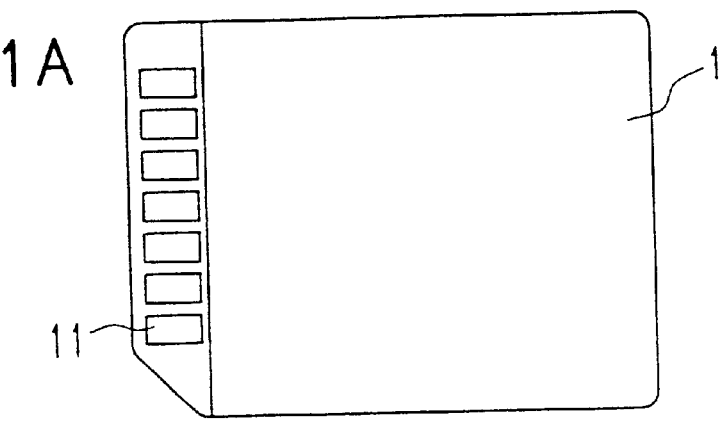
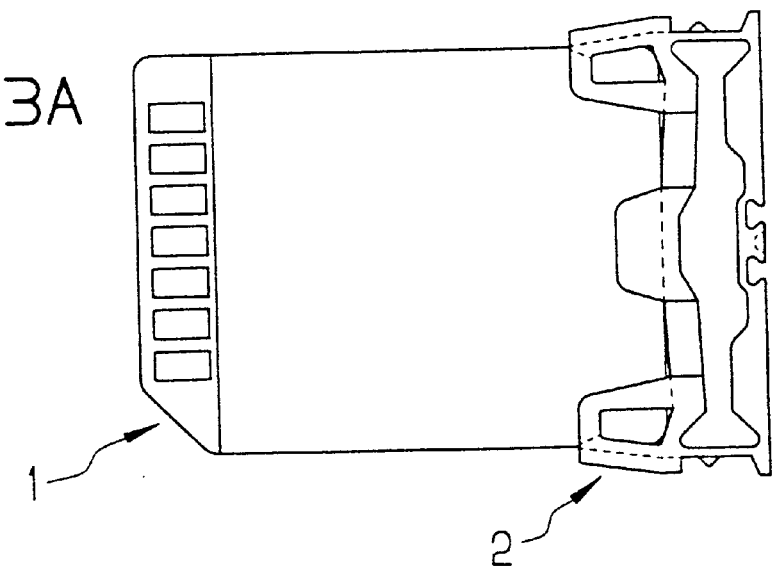
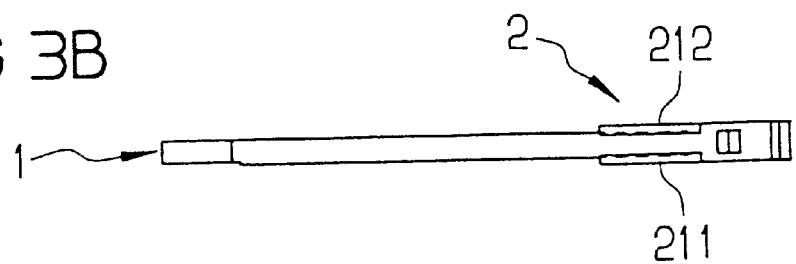

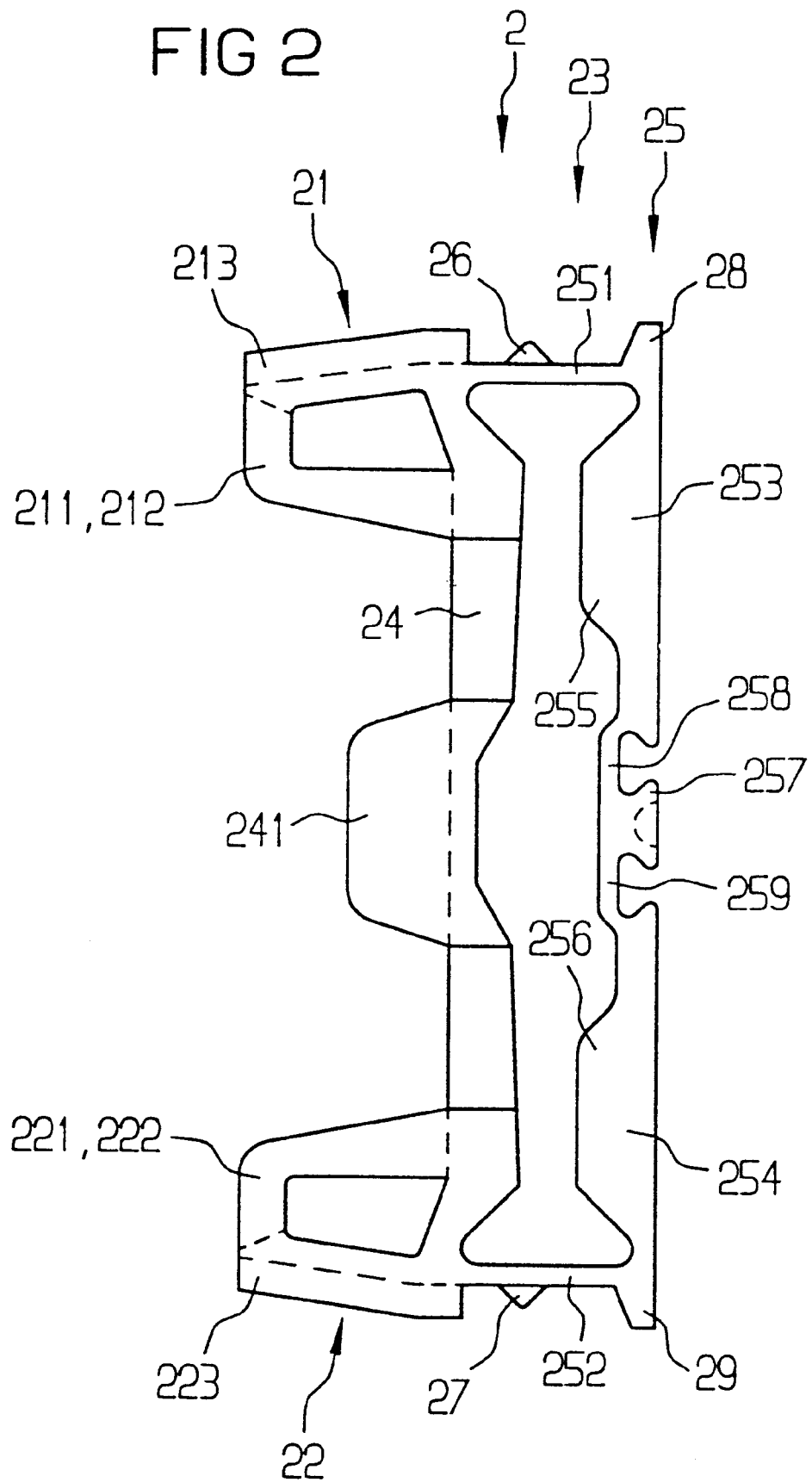

REMOVABLE CARD CARRIER ASSEMBLY

BACKGROUND OF THE INVENTION

FIELD OF THE INVENTION

The present invention relates to a card carrier part which, together with a card to be read, can be introduced into a contact carrier part of a card reader.

Card reader devices in which such card carrier parts can be used are for instance, among a very long list, reader devices in mobile phones, for accepting and/or passing on information furnished by or for a chip card or a SIM card.

Chip cards and SIM cards are used in mobile phones above all for subscriber identification. Layout and function of chip cards and SIM cards are well known and require no further explanation here.

Where card readers for mobile phones (but also in other devices) have a card carrier part which can be introduced together with a chip card or a SIM card into a contact carrier part of the card reader that contains the electrical contacts for contacting the chip card or SIM card, then that card carrier part is a in the form of a drawer or slide. That carrier part is insertible (with or without a chip card or SIM card placed on it and if at all possible held immovably) into a slot of the contact carrier part.

Card reader devices of this type are not limited to the use for the chip cards and SIM cards. Instead, they can be basically used to read any arbitrary other cards as well.

This applies among other things also for so-called MM cards, which are currently being developed and already in the near future will be used as memory storage media, or more precisely as mass memories in semiconductor technology in the most various kinds of electronic equipment. "M" is an acronym which stands for "multimedia" and is an expression of the manifold possible uses of MM cards. MM cards currently have a memory capacity of 64 Mbits. However, memory capacities into the gigabit range are already considered realistic.

Due to the small size of the MM cards—in most MM cards, the size is currently between that of SIM cards and that of chip cards—and also because of the fact that the reader devices for such cards can also be very small (no motors, movable reader heads or the like are required), the use of such MM cards can also be considered for mobile phones. In mobile phones, the MM cards can for instance be used to store telephone books, speech (answering machine function), fax messages, software, and the like.

However, in mobile phones and in many other devices in which MM cards are used, there is only very restricted space available for installing additional card readers. A further difficulty is that the cards to be read must be capable of being changed quickly and easily. Furthermore, the card reader should preferably be capable of holding a plurality of cards at the same time.

The size of card readers that contain card carrier parts as noted in the first paragraph above is determined to a considerable extent by the card carrier parts themselves.

SUMMARY OF THE INVENTION

It is accordingly an object of the invention to provide a card carrier part, which overcomes the above-mentioned disadvantages of the prior art devices and methods of this general type and which enables further miniaturization without sacrificing with regard to the simplicity in the handling and dependability in the operation of card reader devices.

With the foregoing and other objects in view there is provided, in accordance with the invention, a card carrier assembly for a card to be introduced into a contact carrier part of a card reader. The card carrier assembly is to be introduced into the contact carrier part of the card reader together with the card to be read therein, and it comprises a card carrier part adapted to be slipped onto an edge portion of the card and clamping the edge portion.

The basic principle upon which the invention is based, therefore, is the fact that the card carrier is slipped onto the edge of the card to be read and that it clamps onto the edge. The fact that the card is only held at its edge makes it possible to minimize the card carrier part and limit the same essentially to the edge region only of the card. The clamping hold on the card is so sturdy and dependable as to avoid any further necessary support surfaces and/or retaining elements.

The edge of the card onto which the card carrier is slipped is the advantageously the trailing edge of the card (in terms of its insertion into the card reader). The base plate and the side legs of the conventional drawer-type card carriers may be omitted in the principle of this invention. It follows that the size of the slot in the reader into which the card is to be inserted can be substantially reduced both in the height dimension and in the width dimension, as well as in the depth (i.e., the length).

The miniaturization of the slot in the reader leads to a further miniaturization of the entire card reader to the same extent.

In accordance with an added feature of the invention, the card carrier part includes two holding and guide arms and a connecting piece connecting the two holding and guide arms, the card carrier part having the shape of a U with the arms forming legs of the U and the connecting piece connecting the legs.

In accordance with an additional feature of the invention, in a state of repose, the holding and guide arms converge towards one another, and they move elastically and resiliently apart when the card is being inserted in between the holding and guide arms.

In accordance with another feature of the invention, the card has a given thickness, and the card carrier part includes two tabs forming a bracket with a spacing substantially corresponding to the given thickness of the card and extending toward the connecting piece, the tabs projecting from each of the holding and guide arms.

In accordance with a further feature of the invention, the card carrier part including two tongues located above one another and spaced apart substantially by the given thickness of the card, the tongues projecting from the connecting piece and clamping the card in between.

In accordance with again an added feature of the invention, the holding and guide arms have respective sides remote from one another, the sides being formed with lateral ribs disposed and dimensioned such that, when the card carrier part is being inserted into the contact carrier part, the ribs are guided in guide grooves formed in the contact carrier part.

In accordance with again another feature of the invention, the card carrier part has detent elements formed thereon, and the contact carrier part has respective corresponding detent elements formed therein, the detent elements of the card carrier part, upon proper insertion thereof into the contact carrier part, locking in detent fashion with the detent elements of the contact carrier part.

In accordance with a concomitant feature of the invention, there is provided an ejection mechanism integrated into the card carrier part, the ejection mechanism, upon being actuated, unlocking (if any such lock has been effected) the card carrier part from the contact carrier part, and moving the card carrier part at least partway out of the contact carrier part.

In other words, the card carrier part according to the invention may include a locking mechanism (for locking the card carrier part in the state in which it is inserted into the contact carrier part) and an ejection mechanism (for moving the card carrier part at least partway out of the contact carrier part) and can moreover be used like a handle (for holding the card carrier part on inserting it and removing it into and from the contact carrier part), and as a result, despite its reduced size, manipulating the card carrier part of the invention proves to be elegant and simple.

Regardless of this, the card carrier part of the invention may be dimensioned and shaped such that it covers the slot provided in the contact carrier part completely (closes it off from the outside) and is inserted into the card reader like a part that belongs to the housing of the card reader (that is, makes a flush closure thereof), and as a result on the one hand it can take on a guard function for the card reader and on the other can contribute to an aesthetically attractive design of the entire card reader.

In summary, it may be appreciated that the card carrier part according to the invention makes it possible to construct remarkable small card readers which nevertheless are simple to operate and which function reliably.

Other features which are considered as characteristic for the invention are set forth in the appended claims.

Although the invention is illustrated and described herein as embodied in a card carrier part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

FIG. 1A is a plan view onto an MM card;

FIG. 1B is a side elevational view of the MM card;

FIG. 2 is a plan view onto a card carrier part for holding or carrying the MM card of FIG. 1;

FIG. 3A is a plan view onto the card carrier part of FIG. 2 holding or carrying the MM card of FIG. 1;

FIG. 3B is a side elevational view of the card carrier part of FIG. 2 holding the MM card of FIG. 1;

DESCRIPTION OF THE PREFERRED EMBODIMENTS

Figure 4A:
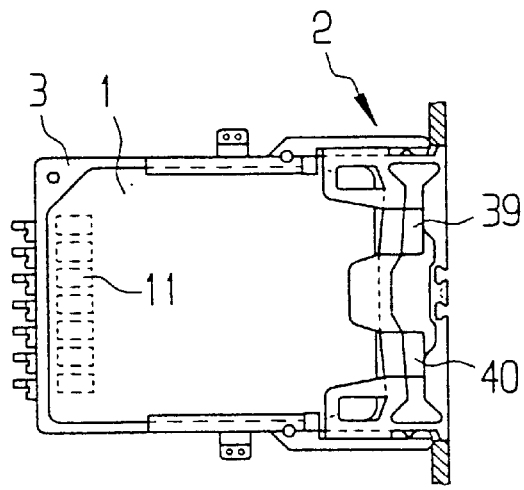
FIG. 4A is a plan view of the card carrier part of FIG. 2 inserted into a contact carrier part and locked in detent fashion therewith.

The card reader described below is a card reader designed for reading MM cards. It should be understood, however, that the invention is limited to card readers designed for that purpose. The invention can also be used in card readers for reading any arbitrary number of other cards (such as "normal" chip cards, SIM cards and the like). The cards may not merely have an arbitrary function but also arbitrary dimensions.

Referring now more specifically to FIGS. 1A and 1B of the drawing in detail, an MM card 1 has contact faces on its surface, in the form of surface contacts 11. These surface contacts 11 of the MM card 1 must be contacted by the card reader.

The MM card 1 in question in the present exemplary embodiment has a length of 32 mm, a width of 24 mm, and a thickness of between 1.3 and 1.4 mm.

The contact elements of the card reader that are needed for contacting the surface contacts 11 of the MM card 1 are accommodated in the contact carrier part of the card reader (which will be described in further detail below). The contact carrier part, in the present exemplary embodiment of the card reader, has a slot, by way of which the MM card 1 to be read, together with a card carrier part that holds the card can be introduced. More precisely, the card carrier is laterally slid in together with the card, from the side of the card reader.

Referring now to FIG. 2, the aforementioned card carrier part is identified by reference numeral 2. As will be described in further detail later, it is designed to be slipped onto the rear end of the card, relative to the direction along which the card is to be moved into the contact carrier part.

The card carrier part 2 includes a first holding and guide arm 21, a second holding and guide arm 22, and a connecting piece 23 connecting them, and it has a substantially U-shaped form, with the holding and guide arms 21, 22 forming the legs of the U.

In the state in which the MM card 1 and the card carrier part 2 have been put together properly (FIGS. 3A and 3B), the MM card 1 is inserted between the holding and guide arms 21, 22 and bracket- and tonguelike elements of the holding and guide arms 21, 22 and of the connecting piece 23 and is clamped by these elements and/or adjusted positionally and secured. The structure, function and mode of operation of the individual components of the card carrier will be described in detail below.

As already noted in part and as the name already suggests, the holding and guide arms 21, 22 serve to hold the card to be read or clamp it in place and to guide the card carrier part 2 inside the contact carrier part.

The holding function can be performed by the holding and guide arms 21, 22, among other means also by the fact that they do not extend precisely parallel to one another but instead converge slightly, with the mutual spacing decreasing toward their free end portions. In the relaxed position of repose shown in FIG. 2, the spacing between the holding and guide arms 21, 22, at least at their free end portions, is less than the corresponding dimensions of the MM card 1 in its state in which it is properly joined to the card carrier part 2. When the card carrier part 2 is slipped onto the MM card 1, or, in other words, when the card is inserted into the card carrier part, the holding and guide arms 21, 22 are spread apart elastically. As a result, the MM card 1 is clamped in place between them.

A further contribution to the holding function of the holding and guide arms 21, 22 is made by the fact that two tabs or loops 211 and 212, on the one hand, and 221, 222 on the other each extend from the facing sides of these arms. The tabs, which form brackets, are placed one above the other with a spacing approximately equivalent to the thickness of the MM card, and they extend toward the connecting piece 23; an MM card 1 to be read, in the state in which it is put together with the card carrier part 2, comes to rest between these tabs. The tabs 211 and 212, on the one hand, and 221 and 222 on the other, can thus act "merely" as an upper and lower stop that limits the place of motion of the MM card, or as clamping elements that clamp the MM card between them.

The tabs 211 and 212, and 221 and 222, or more specifically the additional connection created by them between the holding and guide arms 21, 22 and the connecting piece 23 moreover bring about a stiffening of the holding and guide arms.

The guide function is achieved by the holding and guide arms 21, 22 because, on the sides remote from one another, they each have one laterally protruding rib 213 and 223, which when the card carrier part 2 is inserted into the contact carrier part run in corresponding grooves or guide grooves of the latter.

The connecting piece 23 that joins together the holding and guide arms 21, 22 performs two functions: first, it acts as a stop and an additional holding mechanism for the MM card 1, and second, it acts as a locking mechanism for locking the card carrier part 2 in the contact carrier part and as an ejection mechanism for ejecting the card carrier part 2 from the contact carrier part.

This first function of the connecting piece 23, namely its function as a stop and an additional holding mechanism for the MM card 1, is performed by a cross bar 24 and two tongues 241 protruding from the cross bar and disposed one above the other at a spacing approximately equivalent to the thickness of the MM card. When the MM card is in its state in which it is properly joined to the card carrier part, the crossbar 24 acts as a stop for the card. The tongues 241 function in a similar way to the tabs 211 and 212, and 221 and 222. That is, in the state in which the MM card 1 is put together with the card carrier part 2, they embrace the card and thereby act as an upper and lower stop that limits the play of motion of the MM card, or as clamping elements that clamp the MM card between them.

The second function of the connecting piece 23, namely its function as a locking mechanism for locking the card carrier part 2 in the contact carrier part and as an ejection mechanism for ejecting the card carrier part 2 from the contact carrier part, is performed by a locking and ejection portion 25 that extends substantially parallel to the crossbar 24 and that is joined to the crossbar 24 "merely" via two bendable connecting elements 251 and 252 and is embodied as elastically deformable (bendable) together with the connecting elements 251 and 252 within certain limits, independently of the rigidly embodied crossbar 24.

For locking the card carrier part 2 in the contact carrier part, detent elements in the form of detent protrusions 26 and 27 are provided on the aforementioned connecting elements 251 and 252 by way of which the locking and ejection portion 25 is joined to the crossbar 24; when the card carrier part 2 is properly put together with the contact carrier part, these detent protrusions can lock in detent fashion with associated detent elements (detent indentations) of the contact carrier part.

Alone with the aforementioned connecting elements 251 and 252, the locking and ejection portion 25 includes tilting levers 253 and 254, disposed side by side, and a tilting lever actuating portion disposed between them; the connecting elements 251 and 252 are joined to the ends, remote from one another, of the tilting levers 253 and 254.

The connecting elements 251 and 252, as has already been noted in part above, the relatively thin and are highly elastically deformable; if the card carrier part 2 is made from plastic, then the connecting elements 251 and 254 can be embodied as film hinges.

As can be seen particularly from FIG. 2, the tilting levers 253 and 254 in the example in question each have a thickening 255 and 256, respectively, on their side toward the crossbar 24. These thickenings 255 and 256 on the one hand lend the respective tilting lever the requisite stability (nondeformability) so that it can act as a lever, and on the other they each serve as a bracing element, about which the applicable tilting lever can rotate, in the state in which it has stopped against a stationary point (preferably of the contact carrier part or of the device that contains the card reader).

The ends toward one another of the tilting levers 253 and 254 are joined together (coupled elastically to one another) via the tilting lever actuating portion already mentioned.

The tilting lever actuating portion comprises an approximately centrally disposed pressure point 257 and two elastically deformable (bendable) connecting elements 258 and 259.

The pressure point 257 is a rigid portion, that is, one embodied as essentially undeformable, of the locking and ejection portion 25. Exerting a pressure on the pressure point 257, as will be described in detail hereinafter, undoes the detent connection between the card carrier part 2 and the contact carrier part and causes partial expulsion of the card carrier part 2 and the MM card 1 held by it from the contact carrier part. In the example in question, the pressure point 257 has an approximately hemispherical indentation at a central point, which enables the requisite pressure force to be exerted on the pressure point 257 by placing a penlike instrument, such as a ballpoint pen, there and pressing inward.

The pressure point 257 is joined to the facing ends of the tilting levers 253 and 254 via the respective connecting elements 258 and 259.

The connecting elements 258 and 259 are elastically deformable (bendably) embodied portions of the locking and ejection portion 25. If the locking and ejection portion 25 is made of plastic, then the connecting elements 258 and 259 may be embodied as film hinges.

The card carrier part 2, embodied as described, can be slipped onto the MM card 1 to be read, or the MM card 1 can be inserted into the card carrier part.

In the state in which they are put together properly, an edge portion of the MM card 1, or more precisely the rear end of the card, comes to be located between the holding and guide arms 21 and 22, between the tabs 211 and 212, located one above the other, of the first holding and guide arm 21, between the tabs 221 and 222, one above the other, of the second holding and guide arm 22, and between the tongues 241, one above the other, of the crossbar 24 and are clamped in place between them and/or secured against departing from the intended position.

The state in which the MM card 1 and the card carrier part 2 are put together as described is shown in plan view in FIG. 3A and in side view in FIG. 3B.

The card carrier part 2, joined to the MM card 1 to be read, can be inserted, together with the MM card held or carried by it, into the contact carrier part of the card reader, or more specifically into a slot intended for the purpose.

The state in which this has been done is shown in FIG. 4A, where the contact carrier part is identified by reference numeral 3.

In this state of the card carrier part 2 in which it is inserted into the contact carrier part 3 as shown in FIG. 4A, the detent protrusions 26 and 27 of the card carrier part 2 have snapped into corresponding detent indentations 31 and 32 of the contact carrier part 3 (see FIG. 4C) and thereby secure the card carrier part 2 against being pulled out of the contact carrier part 3 unintentionally.

In the region of the detent indentations 31 and 32, grooves or guide grooves 33 and 34 (see FIG. 4C) are formed, extended longitudinally of the contact carrier part 3, and in which the ribs 213 and 223 of the card carrier part 2 can run. This kind of guide mechanism facilitates the intended insertion of the card carrier part 2 into the contact carrier part 3 and additionally limits the play of motion of the card carrier part 2 inside the contact carrier part 3.

The same is true for grooves or guide grooves 35 and 36, provided farther inward in the slot of the contact carrier part 3 and likewise disposed on the side and extending longitudinally, and in which the MM card 1 to be read runs and is guided.

In the state of the card carrier part 2 shown in FIG. 4A, in which it is inserted as far as the intended terminal position into the contact carrier part 3, the card carrier part is secured in all directions against departing from this position.

In this state, the surface contacts 11 of the MM card 1 come into contact with corresponding contact elements 37 of the contact carrier part 3.

The contact elements 37 are joined to solder lugs 38, by way of which they can be connected (soldered) to associated terminals of a printed circuit board, not shown in the drawings, which among other functions also acts as a carrier for the card reader.

In the state shown in FIG. 4A, the tilting levers 253 and 254, or more specifically their thickenings 255 and 256 in particular, stop against protrusions 39 and 40 of the contact carrier part 3; they take on the function of the aforementioned stationary points about which the tilting levers 253 and 254 must rotate upon removal (ejection) of the card carrier part 2 locked in the contact carrier part 3. The ejection of the card carrier part 2 with the MM card 1 held by it will be described in detail hereinafter.

If and as long as the card carrier part 2 is inserted all the way into the contact carrier part 3, the slot provided for this purpose in the contact carrier part 3 is closed complete and flush with the outside of the housing, as seen from the outside, by the suitably shaped card carrier part 2. This proves to be advantageous in two respects: First, the interior of the contact carrier part is protected against soiling and damage, and second, the device containing the contact carrier part, or the housing of this device, can be given an attractive (aesthetic) external appearance.

If the card carrier part 2 together with the MM card 1 held by it is to be removed from the contact carrier part 3, this requires actuation of the externally accessible ejection mechanism, which is accommodated in the locking and ejection portion 25 and whose function and mode of operation will be described in further detail now in conjunction with FIGS. 4B and 4C.

The actuation of the ejection mechanism is effected by exerting a pressure force against the (externally accessible) pressure point 257. As has already been mentioned above, this can be done for instance by pressing a ballpoint pen or the like into the hemispherical indentation in the pressure point 257 and is schematically shown in FIG. 4B.

Figure 4B:
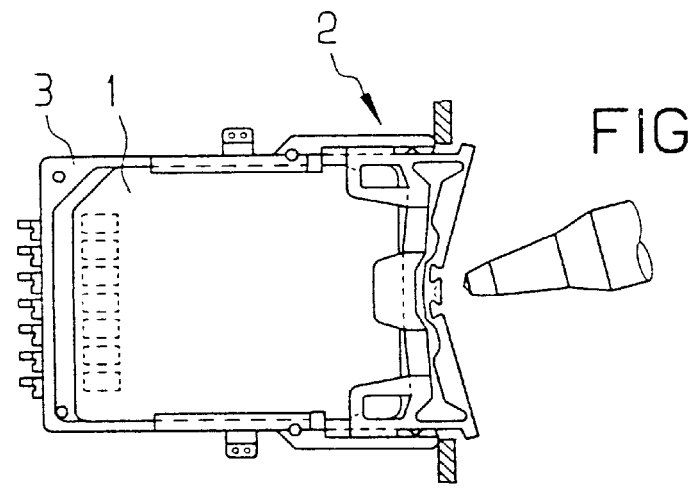
FIG. 4B is a similar view to illustrate the undoing of the lock between the card carrier part and the contact carrier part.
Figure 4C:
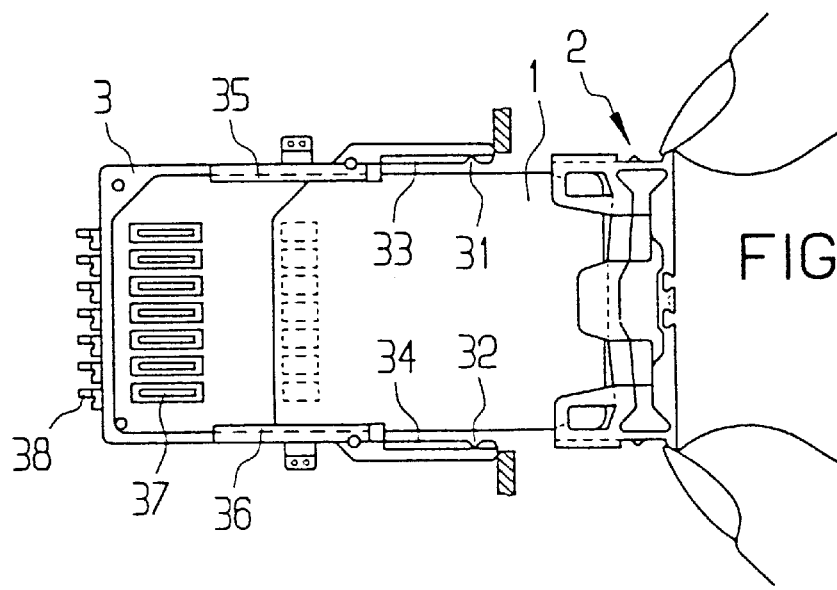
FIG. 4C is a similar view illustrating the withdrawal of the card carrier part from the contact carrier part.

By exertion of a pressure force on the pressure point 257, the locking and ejection portion 25 of the card carrier part 2 departs from its repose or outset position, shown in FIG. 4A, and as a result is deformed as shown in FIG. 4B. Along with this comes an undoing of the lock (separation of the locked-together detent elements) and a partial expulsion of the card carrier part 2 from the contact carrier part 3. The ensuing state is shown in FIG. 4B. The deformation of the locking and ejection portion 25 as shown in FIG. 4B is maintained only so long as a pressure force is exerted on the pressure point 257. If the pressure force exerted on the pressure point 257 is withdrawn, then the locking and ejection portion 25 of the card carrier part 2 returns to its outset or repose position. However, the card carrier part 2 stays in the position in which it is partly ejected from the contact carrier part 3, and from there can be pulled manually all the way out of the contact carrier part by grasping fins 28 and 29 on the sides. This is shown in FIG. 4C.

The exertion of a pressure force on the pressure point 257, which has the effect described, induces the following processes, in detail, in the locking and ejection portion 25:

By means of the pressure force on the pressure point 257, this portion is displaced in the direction of the exerted pressure force, that is, toward the crossbar 24. The elastically bendable connecting elements 258 and 259 follow the motion of the pressure point 257 and thus pull on the tilting levers 253 and 254 to which they are joined. The pulling on the facing ends of the tilting levers has the effect that the tilting levers rotate in opposite directions about the thickenings 255 and 256 that strike the protrusions 39 and 40 of the contact carrier part 3. This in turn has the consequence of exerting a tensile and bending force on the connecting elements 251 and 252. As a result, the detent elements 26 and 31, on the one hand, and 27 and 32, on the other, which were originally locked together come out of engagement, and more or less simultaneously the card carrier part 2 is pulled some distance out of the contact carrier part 1.

If in this state the pressure force exerted on the pressure point 257 is withdrawn, then while the elastically deformed locking and ejection portion 25 does relax, nevertheless the entire card carrier part 2 now protrudes so far out of the device that contains the card reader described that it can be pulled manually all the way out of the contact carrier part 1 by grasping the protruding part, that is, the fins 28 and 29.

Despite the fact that the described ejection mechanism can be made with a minimum number of individual parts, or even in one piece as a compact mechanism, it is still simple to operate and it functions reliably.

In the ejection mechanism described, two tilting levers disposed side by side are used. Although this may currently appear to be the most advantageous embodiment, not least because of its particular reliability and practical use and its ease of manufacture, nevertheless there is no restriction in this respect; instead, many modifications are conceivable. For instance, it may also be considered whether to provide only a single tilting lever, and/or to provide other kinds of levers instead of the tilting levers used.

Despite the versatile functions of the card carrier part 2, this part is embodied as quite small and compact because it can be slipped onto the rear edge of the card. In particular, the bottom and side parts of the card carrier parts, which until now have been embodied like a drawer, can be left out. As a result, the slot to be provided in the contact carrier part for the introduction of the card to be read can be made considerably smaller, both in terms of its height and in its width and length or depth. This in turn enables a miniaturization of the entire card reader.

It is also possible for a plurality of the card readers according to the invention to be placed one above the other. One practical example is shown in FIG. 5.

Figure 5:
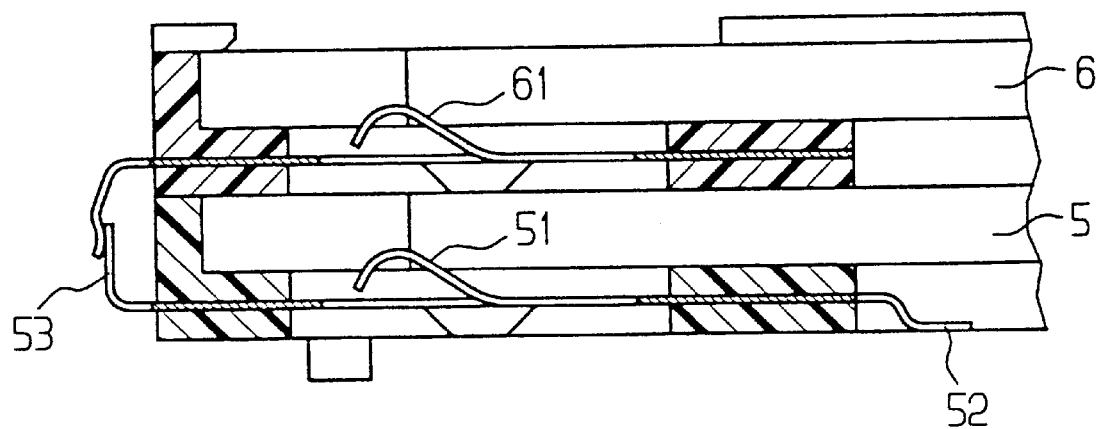
FIG. 5 is a partial, sectional view taken through two contact carrier parts disposed one above the other.

As shown in FIG. 5, a first (lower) card reader 5 and a second (upper) card reader 6, or more precisely the contact carrier parts thereof, are placed one above the other.

The card readers have contact elements 51 and 61, respectively, which can be put into contact with the surface contacts 11 of the MM cards to be read at a given time. The aforementioned contact elements merge with conductive structures that are closed off by solder lugs 52 and/or card reader connecting elements 53 and 62.

The solder lugs 52 are intended for soldering to suitable connection points of a printed circuit board, not shown in the drawings; the card reader connecting elements 53 and 62 are provided for the connection (for instance in parallel) of card readers disposed one above the other.

The lower card reader 5 in terms of FIG. 5 has both solder lugs 52 and card reader connecting elements 53; the upper card reader 6 shown in FIG. 5 has only card reader connecting elements 62.

The card reader connecting elements 53 and 62 come into contact in this state of the card readers 5 and 6 where they are placed one above the other, as shown in FIG. 5. In the position, they can be soldered, welded or joined together in some other way.

The contact elements, the solder lugs, the card reader connecting elements, and the structures of the various card readers that join them together are integrated into the housing of the respective card reader. That is, the housings are manufactured by spray-coating of the parts mentioned and as a result can be made especially small.

Figure 6:
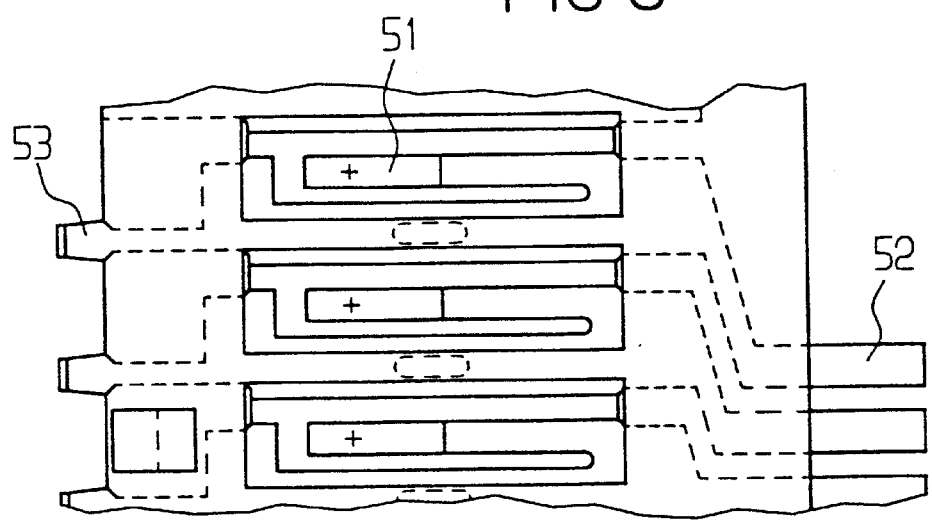
FIG. 6 is a plan view of the lower contact carrier part of the carrier parts shown in FIG. 5.

The aforementioned conductive structures (partially spray-coated and shown in dashed lines there), including the contact elements 51, solder lugs 52 and card reader connecting elements 53 of the lower card reader in FIG. 5 are shown in plan view in FIG. 6.

In summary, it will be appreciated that, due to the miniaturization of the card carrier part and other reasons, the invention has rendered it possible to create card readers whose size is reduced to a minimum, while their function otherwise remains equally good and reliable or is even improved.

I claim:

1. In combination with a card to be introduced into a contact carrier part of a card reader, a card carrier assembly to be introduced into a contact carrier part of the card reader together with the card to be read therein, the card carrier assembly comprising: a card carrier part slipped onto an edge portion of the card and clamping the edge portion, said card carrier part being removable from the card reader, and said card carrier enabling said card to be slipped onto said card carrier when said card carrier assembly is removed from the card reader, said card carrier part including two holding and guide arms and a connecting piece connecting said two holding means and guide arms.

2. The card carrier assembly according to claim 1, wherein said card carrier part has a U shape with said arms forming legs of the U and said connecting piece connecting said legs.

3. The card carrier assembly according to claim 2, wherein, in a state of repose, said holding and guide arms converging towards one another, and moving elastically and resiliently apart when the card is inserted in between said holding and guide arms.

4. The card carrier assembly according to claim 2, wherein the card has a given thickness, and said card carrier part includes two tabs forming a bracket with a spacing substantially corresponding to the given thickness of the card and extending toward the connecting piece, said tabs projecting from each of said holding and guide arms.

5. The card carrier assembly according to claim 2, wherein the card has a given thickness, and said card carrier part including two tongues located above one another and spaced apart substantially by the given thickness of the card, said tongues projecting from said connecting piece and clamping the card in between.

6. The card carrier assembly according to claim 2, wherein said holding and guide arms have respective sides remote from one another, said sides being formed with lateral ribs disposed and dimensioned such that, when said card carrier part is being inserted into the contact carrier part, said ribs are guided in guide grooves formed in said contact carrier part.

7. The card carrier assembly according to claim 1, wherein said card carrier part has detent elements formed thereon, and the contact carrier part has respective corresponding detent elements formed therein, said detent elements of said card carrier part, upon proper insertion thereof into said contact carrier part, locking in detent fashion with said detent elements of the contact carrier part.

8. The card carrier assembly according to claim 1, including an ejection mechanism integrated into said card carrier part, said ejection mechanism, upon being actuated, unlocking said card carrier part from the contact carrier part, and moving said card carrier part at least partway out of the contact carrier part.

* * * * *